United States Patent [19]

Suzuki et al.

[11] 4,082,902

[45] Apr. 4, 1978

[54] SPARK-RECORDING TYPE PRINTING METHOD AND SPARK-RECORDING MATERIAL FOR USE THEREOF

[75] Inventors: Akira Suzuki; Keiji Kubo; Suguru Kunitake; Fumiaki Arai, all of Tokyo, Japan

[73] Assignee: Kabushiki Kaisha Ricoh, Tokyo, Japan

[21] Appl. No.: 504,709

[22] Filed: Sep. 10, 1974

[30] Foreign Application Priority Data

| | | |
|---|---|---|
| Sep. 18, 1973 | Japan | 48-10525 |
| Sep. 26, 1973 | Japan | 48-107611 |
| Sep. 26, 1973 | Japan | 48-107612 |
| Oct. 3, 1973 | Japan | 48-110502 |
| Oct. 3, 1973 | Japan | 48-110503 |
| Nov. 26, 1973 | Japan | 48-131730 |
| Dec. 3, 1973 | Japan | 48-134260 |

[51] Int. Cl.[2] ..................... G01D 15/08; G01D 15/34; B41N 1/00; B41C 1/10

[52] U.S. Cl. ............................. 428/457; 101/DIG. 2; 101/453; 101/467; 346/135; 346/163; 428/461; 428/463; 428/500; 428/514; 428/537; 428/538; 428/539

[58] Field of Search ........................ 346/135; 428/457; 101/DIG. 2

[56] References Cited

U.S. PATENT DOCUMENTS

| | | | |
|---|---|---|---|
| 1,245,120 | 10/1917 | Neidich | 101/467 |
| 2,713,822 | 7/1955 | Newman | 101/DIG. 2 |
| 2,826,511 | 3/1958 | Messinger | 346/135 |
| 2,951,441 | 9/1960 | Wolf et al. | 428/520 |
| 2,983,220 | 5/1961 | Dalton et al. | 101/462 |
| 3,113,511 | 12/1963 | Dalton | 346/135 X |
| 3,113,512 | 12/1963 | Newman | 101/461 |
| 3,151,549 | 10/1964 | Oransky et al. | 346/135 X |
| 3,376,162 | 4/1968 | Spencer et al. | 101/467 |
| 3,861,952 | 1/1975 | Tokumoto et al. | 346/135 |
| 3,875,023 | 4/1975 | Sekine | 346/135 |

FOREIGN PATENT DOCUMENTS

| | | | |
|---|---|---|---|
| 2,256,580 | 5/1973 | Germany | 101/462 |

*Primary Examiner*—Clyde I. Coughenour
*Attorney, Agent, or Firm*—Cooper, Dunham, Clark, Griffin & Moran

[57] ABSTRACT

The present invention provides a spark-recording type printing method and a spark-recording material for use in the method, which printing method comprises the processes of: forming an image on a spark-recording material by the spark-recording method, said spark-recording material comprising a support and a layer of metal deposited thereon by vacuum evaporation, and, if necessary, being provided with a colored layer interposed between said support and metal layer, and if further necessary, being provided with a protective layer which is easy to desensitize and/or a desensitized layer which requires no desensitization treatment as formed on said metal layer; and conducting offset printing by employing said spark-recording material having an image formed thereon as a master either after subjecting it to desensitization treatment when it is not provided with said desensitized layer or directly when it is provided with said desensitized layer.

14 Claims, No Drawings

SPARK-RECORDING TYPE PRINTING METHOD AND SPARK-RECORDING MATERIAL FOR USE THEREOF

BACKGROUND OF THE INVENTION a. Field of the Invention

The present invention relates to a spark-recording type printing method wherein a record obtain through the spark-recording process is employed as the master in performing offset printing, coupled with a spark-recording material for use in said printing method.

b. Description of the Prior Art

Various plates including (1) zinc and aluminum plates for use in lithoprinting, (2) PS plates and (3) electrophotographic sensitive materials have been employed in offset printing. Among these conventional plates, the plates of Class (1) above being to the category of the general printing and can be utilized as masters only after various complicated processes of plate-making. PS plates of Class (2), though the plate-making process therefor is somewhat simplified, still require considerable time for operation so that they cannot be utilized as masters in geneal office work. The materials of Class (3), while they can be prepared by utilzing general electrophotographic copying machines and therefore can be processed simply for general office work, are not totally satisfactory because the machines for their preparation require too much space.

In the field of facsimile recording, images have been produced rather simply on various spark-recording materials, such as the type consisting of a colored support having a layer of metal deposited thereon through vacuum evaporation. However, the materials and images produced are defective in that they cannot be utilized to produce a large number of copies.

SUMMARY OF THE INVENTION

The object of the present invention is to provide spark-recording type printing methods which render it possible to make plates simply through a single process of spark-recording in facsimile and to produce a large number of copies by utilizing the resulting plate as a master for offset printing.

More specifically, the present invention provides spark-recording type printing methods, coupled with spark-recording materials for use in said methods, which printing methods comprise the processes of: forming an image on a spark-recording material by the spark-recording method, said spark-recording material comprising a support and a layer of metal deposited thereon by vacuum evaporation (hereinafter referred to as metal-deposited layer). The materials may be provided with a colored layer interposed between said support and metal-deposited layer, and may also be provided with a protective layer which is easy to desensitize and/or a desensitized layer which requires no further desensitization treatment as formed on said metal-deposited layer; and conducting offset printing by employingsaid spark-recording material having an image formed thereon as a master either after subjecting it to desensitization treatment when it is not provided with a desensitized layer or directly when it is provided with a desensitized layer.

In the present invention, both processes of spark-recording and offset printing are performed by the conventional methods. The process of desensitization, when employed, is also conventional.

Spark-recording materials for use in the methods of the present invention comprise a support and a metal-deposited layer, and can be further provided with a colored layer interposed between said support and metal-deposited layer or a protective layer and/or desensitized layer on said metal-deposited layer. Further, as a special case (in this case the process of desensitization treatment can be dispensed with), a desensitized layer can be provided on either said metal-deposited layer or protective layer. In short, the spark-recording materials of the present invention may be divided broadly into the following three categories:

1. Materials comprising a support and a metal-deposited layer;

2. Material comprising a support, a metal-deposited layer and a protective layer or a densensitized layer, wherein a. said protective layer is a hydrophilic polymer, or
   b. said protective layer is a polymer and an acid-soluble polyvalent metal oxide, or
   c. said desensitized layer is a desensitizing substance.

3. Material comprising a support and a metal-deposited layer, a protective layer and a desensitized layer formed on said support.

All of these spark-recording materials can be further provided with a colored layer interposed between the support and the metal-deposited layer.

The presently preferred compositions of each of these spark-recording materials will now be discussed.

In the spark-recording materials of category 1, the surface metal-deposited layer is desirably roughened so as to wet easily with damping water, to be hydrophilic and to have water retention ability.

A variety of supports can be utilized including paper or plastic films. If paper is used, it will desirably have high tensile strength. Plastic films are generally superior to paper.

Colored layers may be formed by coating a composition containing a coloring agent or pigment such as carbon black or a dyestuff and a resin. The resin contained in the colored layer should be capable of accepting ink and is therefore oleophilic. Since damping water is applied to it during printing, it should be water-proof. Typical of the oleophilic resins (or oleophilic polymers to be described later on) of this type are polyalkylene resins such as polyethylene, polypropylene, etc., polyvinyl acetal resins such as polyvinyl formal, polyvinyl acetal, etc., polystyrene, polyvinyl acetate, polyvinyl chloride, polyvinylidene chloride, polyacrylic esters, polymethacrylic esters and polyamides as well as copolymers of these resins. The usual ratio of resin to coloring agent (including the particles for the purpose of roughing the surface to be described later on) is about 10:1 by weight. Instead of a colored layer, the support itself may function as the colored layer by utilizing colored papers or plastic films.

The forming of the metal-deposited layer for the spark-recordng material to be used in the present invention is performed by the conventional method of depositing metal by vacuum evaporation. In the case of the recording material of category 1 above, it is desirable that the surface of the metal-deposited layer be rough or have fine undulations. This may be accomplished by embossing, sandblasting, adding coarse particles of pigment, or chemically treating the surface of the support before depositing metal thereon by vacuum evaporation. If there is a colored layer between the support and the metal-deposited layer, it is possible to rough the surface of said material by adding coarse particles to the colored layer or by utilizing other processes of roughing the surface of the support. In this connection, in the case of the recording materials of categories 2 and 3, there is no particular necessity for roughing the support or the colored layer.

With recording material of category 1, by roughing the surface of the metal-deposited layer it is possible to satisfy the requirements for the master for offset printing by improving the hydrophilicity and water retaining capacity of the product and to make its surface look white due to irregular reflection and to thereby produce a satisfactory recorded image. The surface of the metal-deposited layer of the recording material is normally roughened to the extent of about 100 - 300 mesh to present an irregularly rugged pattern. The process of roughing the surface in this invention corresponds to the sandblast process which is applied to the zinc or aluminum plates in general lithoprinting and, as in the case of these metal plates, when the degree of roughing of the surface is appreciably less than the lower limit of the foregoing range and the surface is too smooth, the water-retaining ability of the metal-deposited layer decreases and desensitization of the offset is difficult. In case the degree of roughing appreciably exceeds the upper limit of said range and the surface is too rough, the printing ink fails to spread evenly, and the image is unsatisfactory.

Any of a variety of metals may be used to form the metal-deposited layer, but since it is intended for use as a master for offset printing, metals having good hydrophilicity and water retaining ability are preferable. Generally speaking, metals having less ionization tendency than hydrogen are regarded as strongly hydrophilic, while metals having greater ionization tendency than hydrogen are regarded as strongly oleophilic. Accordingly, from the viewpoint of practical use, stainless steel, aluminum, chromium, iron, nickel, zinc, lead and the like are desirable, but because of the desirable whiteness of the surface of the resulting recording material aluminum is the optimum metal in category 1. The thickness of the metal-deposited layer is normally from about 300 to 500 A.

To form the protective or desensitized layer in a product of category 2 (a), a solution containing a hydrophilic polymer is employed. A solution or dispersion containing a high-molecular weight compound and an acid-soluble polyvalent metal compound is employed to produce a product of category 2 (b). A solution or dispersion containing a desensitizing substance is employed to produce recording materials of category 2 (c). The amount of coating (in dry weight) is from about 0.05 to 1 $g/m^2$ with products of 2 (a) and 2 (c). With products of 2 (b), the amount of coating depends upon whether the polyvalent metal compound employed is semiconductive. When the polyvalent metal compound is not semiconductive, the appropriate amount of coating is from about 0.05 to 1 $g/m^2$, and when the compound is semiconductive, it is from about 0.05 to 7 $g/m^2$. When the amount of coating appreciably exceeds the upper limit of these ranges, the resistance of the protective layer is too high to permit smooth spark-recording, resulting in failure to obtain a satisfactory recorded image. When the amount of coating is appreciably less than the lower limit of these ranges, the metal-deposited layer may be scratched by the recording needle or by ordinary handling.

With recording materials of category 2 (b), the appropriate mixing ratio of polymer to polyvalent metal compound is normally from about 1:5 to 3:1 by weight.

Suitable polyvalent metal compounds include water- or acid-soluble compounds of metals belonging to Groups II - VIII of the Table of Periodic Law, e.g., Mg, Ca, Ba, Zn, Cd, Al, Sn, Cu, Pb, Ti, Cr, Se, Te, Mn, Fe, Ni and Co. Typically, the oxides, sulfides, hydroxides, halogenides, carbonates, phosphates, sulfates, nitrtes or organic acid salts of these metals will be used. The presently preferred compounds include white pigments which are not semiconductive, such as barium sulfate, calcium carbonate, barium carbonate, magnesium carbonate, alumina, etc., and white pigments which are semiconductive, such as zinc oxide, titanium oxide, etc.

Polymers utilized with recording materials of category 2 (b) are desirably hydrophilic from the viewpoint of desensitization effect. However, since the polyvalent metal compound to be used in association with the polymer becomes hydrophilic by desensitization treatment as will be described hereinafter, even oleophilic substances may be employed. Typically useful examples of hydrophilic substances applicable to the recording materials of category 2 (a) and 2 (b) include gum arabic, polyvinyl alcohol, casein, gelatin, starch derivatives, cellulose derivatives (e.g., carboxymethyl cellulose, methyl cellulose, ethyl cellulose, hydroxyethyl cellulose, cellulose acetate, etc.) as well as Na salts thereof such as CMC Na salt, sodium alginate, vinyl acetate ~ λ maleic acid copolymers, styrene ~ maleic acid copolymers, polyacrylic acids and Na salts thereof, polymethacrylic acids and Na salts thereof. Oleophilic high-molecular compounds include those used in forming the colored layer, such as polystyrene, polyethylene, polypropylene, polyvinyl chloride, polyvinylidene chloride, polyvinyl acetate, polyacrylic (or methacrylic) ester, polyvinyl formal, polyvinyl butyral, polyester, polyamide and their copolymers. These hydrophilic or oleophilic polymers may be applied after mixing. Water soluble polymers may be subjected to treatment to improve water-durability by means of a crosslinking agent, such as melamine and formaldehyde.

The protective layer formed as above constitutes the non-image area. If it is not formed from a hydrophilic polymer, it can be easily desensitized to become hydrophilic.

For forming the desensitized layer of category 2 (c), desensitizing substances such as oil-repellent silicone elastomers (rubber-like solids obtained by curing organic polysiloxanes), silicone varnish, silicone oil, carbon fluoride compound, etc. or a mixture of hydrophilic polymers such as gum arabic. CMC Na salt, etc. and phosphate can be utilized. the silicone elastomer herein can be obtained by curing or polymerizing the room-temperature curing (RTV) silicone rubber, and is composed of repetition of the following structural unit:

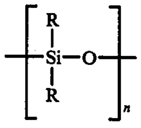

wherein $n$ is an integer in the range of about 2 - 2000 or more; R represents monovalent alkyl or allyl group, halogenated alkyl or allyl group, or cyanoalkyl group, and less than 2 - 3% of total R is vinyl, phenyl or halogenated-vinyl or -phenyl. The majority of R substituents is usually methyl.

The carbon fluorine compounds contain fluorine and carbon and resemble hydrocarbons in structure. Such groups as $—CF_2—$ and $—CF_3—$ in the molecule have oil- and water-repellency and surface active properties which produce a strong affinity with metal. The silicone varnishes and oils are of the conventional varieties.

These oil-repellent substances are applied upon dissolving in an appropriate solvent. However, in the case of silicone elastomers obtained by curing or polymerizing RTV silicone rubber, it is applied upon adding a curing agent and a solvent (like toluene) when necessary, and if necessary, a filler such as fine silica powder, precipitated calcium carbonate, zinc oxide, and the like. The carbon fluorine compound can be dissolved in either an oleophilic solvent such as toluene or a hydrophilic solvent such as water or alcohol and a solvent which is both oleophilic and hydrophilic such as acetone. A mixture of these solvents may also be employed. Other desensitizing substances useful for category 2 (c) will be discussed below.

Spark-recording materials of category 3 are prepared by further forming a desensitized layer containing at least one of the foregoing oil-repellent substances, or a phosphate on the protective layer of a product of either category 2 (a) or 2 (b).

In accordance with the method of this invention, utilizing spark-recording materials of category 1, 2 (a) or 2 (b), the portion of the metal-deposited layer (and the protective layer) of the recording materials corresponding to the original image is punctured by the spark-recording process to form a recorded image. Next, the thus processed recording material is subjected to desensitization treatment to thereby prepare an offset master which can be used for offset printing. Conventional desensitizing liquids for use in offset printing may be used. These include various aqueous solutions obtained by adding acids, for instance, organic acids such as citric or acetic acids and the like to ferrocyanate and/or ferricyanate or phosphate compositions. To improve the printing durability and wettability, the aforesaid crosslinking agents and monovalent or polyvalent alcohols may be added. The pH value of the desensitizing liquid is desirably from about 2.0 to 9.0 — preferably 2.0 to 3.5. When the pH value is appreciably less than 2.0, the border of the image area on the master becomes unclear and the master may not be used to produce a large number of prints, while in the case where the pH value is more than 9.0, emulsification of aliphatic printing inks takes place to impede smooth printing.

In the desentization treatment, when the protective layer comes in contact with the desensitizing liquid, the polyvalent metal salt on the surface of the protective layer changes into a hydrophilic/water-insoluble substance (which is also insoluble in dilute acid and dilute alkali). The mechanism is such that the polyvalent metal salt is first dissolved because of the acid contained in the desensitizing liquid to liberate metal ions, and the metal ions react with ferrocyanate and/or ferricyanate or phosphate to thereby produce a corresonding polyvalent metal salt (hereinafter called a new polyvalent metal salt; for instance, in case of MII being divalent metal ion, $M_2II[FeII(CN)_6]$ (ferrocyanate), $M_3II[FeII(CN)_6]_2$ (ferricyanate, $M_3II(PO_4)_2$ (phosphate), etc. are produced. This new polyvalent metal salt is a hydrophilic/water-insoluble substance, and is firmly bonded to the surface of the protective layer by means of the polymer which acts as the binder, so that, through this desensitization treatment, an offset master having hydrophilic property and a superior printing durability is obtained. Those salts produced as above are insoluble or only slightly soluble in water or acid, but to further reduce the solubility, ammonium, magnesium, calcium or zinc salts of, for instance, phosphoric, nitric or dichromic acid may be added.

In the case of the spark-recording materials of category 1, at the time of said desensitization treatment, it is desirable to employ a desensitizing liquid of the foregoing hydrophilic polymer and phosphoric acid or its salt. Such desensitizing liquids can impart hydrophilicity and water-retaining ability to even non-roughed metal-deposited layers. The hydrophilic polymer adheres well to the metal-deposited layer and manifests desensitizing efficiency without further additives. However, the adhesive power can be enhanced by the use of phosphoric acid or its salts.

Among the applicable polymers, gum arabic and CMC Na are especially effective. This is attributable to the fact that gum arabic (a mixture of calcium, potassium and magnesium salts of arabic acid) liberates arabic acid by the action of acid, and CMC Na liberates CMC (having COOH group) by the action of acid. The thus liberated arabic acid and CMC are bonded firmly to the surface of metal. CMC Na is superior in adhesive power to gum arabic of equal viscosity, renders uniform coating, and has satisfactory wettability, so that CMC Na is the optimum substance among the various hydrophilic polymers which may be used in the desensitizing liquids of this invention. The appropriate mixing ratio of hydrophilic polymer to phosphoric acid or its salt is from about 0.01 to 0.05 part by weight of the latter relative to 1 part by weight of the former. When the amount of hydrophilic polymer is excessive, the surface of metal is corroded and blackened, and there is deterioration of the adhesive bond with resulting exfoliation of the adhering film, while, when said amount is too little, the thickness of the adhering film is insufficient and the desired desensitization effect canot be realized.

In the case of employing the spark-recording materials with desensitized layers of categories 2 (c) and 3 according to the present invention, desensitization treatment can be dispensed with. Among the spark-recording materials under category 2 (c), ones which employ no oil-repellent substance and the spark-recording materials under category 3 can be obtained through the processes of forming a colored layer, a metal-deposited layer, and a protective layer if desired, on a support, and then coating the foregoing desensitizing liquid (hereinafter called 'desensitized-layer forming liquid') thereon. When applying the desensitized-layer forming liquid, it is advisable to apply a liquid selected in accordance with properties of the surface to be coated. In other words, in the case of forming a desensitized layer on the surface of a metal-deposited layer, it is sufficient to apply a desensitized-layer forming liquid containing the aforesaid hydrophilic polymer — preferably gum arabic or crboxymethyl cellulose Na, and more preferably carboxymethyl cellulose Na — and phosphoric acid or its salt; and in the case of forming the desensitized layer on the surface of a protecting layer, it is sufficient to apply a desensitized-layer forming liquid containing phosphoric acid or its salt. In the former case, there is formed a layer containing gum arabic, cellulose and phosphate or a layer containing phosphate and gum arabic provided on the metal-deposited layer as occasion demands, while in the latter case, there is formed a layer containing phosphate. The following are examples of the application of the desensitized-layer forming liquid. In the case of protective layers containing zinc oxide, a potassium ferrocyanide solution can be employed.

In the case of forming on the metal-deposited layer:

| | | | |
|---|---|---|---|
| (1) In the case of zinc: | | | |
| (A) | Gum arabic solution 9° Be' | 1,000 | cc |
| | Ammonium phosphate | 20 | g |
| | Ammonium nitrate | 10 | g |
| | Ammonium bichromate solution | 3 - 4 | drops |
| | Tannic acid | 5 | g |
| (B) | Gum arabic solution 9° Be' | 1,000 | cc |
| | 2.5% Solution of tannic acid | 200 | cc |
| | Phosphoric acid (95%) | 14 | cc |
| (2) In the case of aluminum: | | | |
| (C) | Gum arabic solution 10° Be' | 1,000 | cc |
| | Phosphoric acid (Specific gravity: 1.12) | 30 | cc |
| (D) | Water | 78 | cc |
| | Ammonium nitrate | 15 | g |
| | Phosphoric acid (85%) | 23 | cc |
| | Gum arabic 13° Be' | 1,000 | cc |

By applying the above combinations, there is formed a phosphate layer of $Zn_3(PO_4)_2$ in the case of zinc, and a phosphate layer of $AlPO_4$ in the case of aluminum. Further, among these examples, gum arabic may be substituted by carboxymethyl cellulose Na.

In the case of forming the protective layer containing a polyvalent metal compound and polymer:

| | | | |
|---|---|---|---|
| (1) In the case of zinc oxide: | | | |
| (E) | 1% Aqueous solution of potassium ferrocyanide. In this case, zinc oxide is converted to hydrophilicity by the reaction between potassium ferrocyanide and zinc oxide as follows: $2ZnO + K_4Fe(CN)_6 + 4H^+ \rightarrow Zn_2Fe(CN)_6 + 2H_2O + 4K^+$ | | |
| In the case of forming the protective layer containing a hydrophillic polymer: | | | |
| (1) In the case of polyvinyl alcohol: | | | |
| (F) | Aluminum sulfate | 15.0 | g |
| | Potassium nitrate | 11.3 | g |
| | Ammonium dihydrogen phosphate | 20.6 | g |
| | Water - amount making the total | 1,000 | cc |
| (G) | The same as (E) in the case of aluminum. | | |

The above liquids are thinly coated (to the extent of less than 1 μ in dry thickness) on the surface-to-be-coated by means of sponge or soft brush and the like. The ratio of phosphoric acid or its salt to hydrophilic polymer contained in the desensitized-layer forming liquid is as set forth above.

The following non-limiting examples are given by way of illustration only.

DESCRIPTION OF THE PREFERRED EMBODIMENTS

EXAMPLE 1

By employing magnesium carbonate powder having a mean particle diameter of 20 - 30 μ as the pigment to rough the surface, carbon black having a mean particle diameter of 0.02 μ as the coloring agent and ethyl cellulose as the resinous binder, and dissolving and dispersing these compounds in methanol, a colored liquid was prepared. Subsequently, by coating this colored liquid on a slick paper weighing 100 $g/m^2$ and drying, a colored paper was prepared. The amount of the binder utilized was insufficient to cover the particles of magnesium carbonate.

Next, by depositing aluminum on the colored surface of the colored paper by vacuum evaporation to form a 0.04 μ-thick metal-deposited layer, a spark-recording material was prepared. When the roughness of the surface of this metal-deposited layer was measured by the glossiness measuring method (the 75°-mirror surface glossiness measuring method according to JIS Z8741-1962), it was 2.75%. This value represents the light-scattering property of the surface of the metal-deposited layer and indicates the finely roughed state of said surface. In this connection, in the case of a layer of aluminum deposited on the surface of glass by vacuum evaporation, the value of glossiness was 94.5%, and in the case of a layer of zinc oxide deposited on the surface of glass sheet, it was 0.55% (that is, the light-scattering was almost perfect), or a value which is indicative of approximately perfect light-scattering plate. With commercial spark-recording papers, the value of glossiness is in the range of about 13 - 16%, indicating low degrees of roughness of surface. In the case of a recording material having a roughness of such degree, a sufficient desensitization of the metal-deposited layer is not possible because the desensitizing liquid fails to become attached to the metal-deposited layer and is repelled therefrom, and the background of the image is stained resulting in falure to obtain an image of good quality.

When an image was formed on the spark-recording paper obtained in the present example under the condition for recording that 5Ω in internal impedence, 35 V in charged voltage for recording, and 2.1 m/sec in velocity of recording, there was obtained an image of good quality having an image concentration of 1.08 and a contrast of 0.88. Subsequently, when offset printing was conducted by employing this recording paper upon coating a desensitization liquid prepared by admixing equivalent volumes of the following compositions A and B, there were obtained as many as 200 prints with good quality images.

| | | | |
|---|---|---|---|
| Composition A | Aluminum sulfate | 3.01 | g |
| | Potassium nitrate | 2.27 | g |
| | Water - amount making the total | 100 | cc |
| Composition B | Ammonium dihydrogen phosphate | 4.12 | g |
| | Water - amount making the total | 100 | cc |

EXAMPLE 2

By employing zinc oxide power having a mean particle diameters of 5 - 10 μ as the pigment to rough the surface, carbon black having a mean particle diameter of 0.02 μ as the coloring agent and ethyl cellulose as the resinous binder, and dissolving and dispersing these compounds in methanol, a colored liquid was prepared. Subsequently, by coating this colored liquid on a slick paper weighing 80 $g/m^2$ and drying, a colored paper was prepared. The amount of binder utilized was insufficient to cover the particles of zinc oxide.

By depositing aluminum on the colored surface of the colored paper by vacuum evaporation to form a 0.04 μ-thick metal-deposited layer, a spark-recording paper was prepared. The roughness of the surface of this recording paper was 0.85%, and proved to be more finely roughed than the spark-recording paper of Example 1.

When an image was formed on this spark-recording paper under the condition for recording that 5Ω in internal impedence, 35 V in charged voltage for recording and 2.1 m/sec in velocity of recording, there was obtained a good quality image having an image concentration of 1.21 and a contrast of 1.04. Subsequently, when offset printing was conducted by employing this recording paper upon coating a desensitizing liquid prepared by admixing equal volumes of the following compositions A and B, there were obtained as many as about 100 prints having a good quality image. As to the image formability, the present recording paper proved superior to that of Example 1, and the roughness of the surface was found to be properly fine and not excessive.

| | | | |
|---|---|---|---|
| Composition A | Aluminum sulfate | 3.01 | g |
| | Potassium nitrate | 2.27 | g |
| | Water - amount making the total | 100 | cc |
| Composition B | Ammonium dihydrogen phosphate | 4.12 | g |
| | Water - amount making the total | 100 | cc |

EXAMPLE 3

The surfce of a 50 μ-thick film consisting of a mixture of 100 parts of polyvinyl chloride and 5 parts of carbon black was dipped in a mixture of tetrahydrofuran and methanol (mixing ratio = 80:20) for 1 second, and dipped in methanol for 30 seconds immediately thereafter. It was then dried at room temperature. Through this chemical treatment, the surface of said film was roughed to a finely porous condition. When this surface was coated with aluminum by vacuum evaporation to the extent of 0.04 μ in thickness, there was formed a white aluminum deposited layer having fine undulations with no metallic luster. The surface glossiness of the thus obtained spark-recording film was 1.05% and proved to have a fairly fine surface roughness.

When the image-recording was conducted by employing this spark-recording film under the prescribed condition for recording (5Ω in internal impedence; 40 V in charged voltage for recording; 2.1 m/sec in velocity of recording), there was obtained a distinct image having a contrast of 1.01. Subsequently, when offset printing was conducted by employing this recording film upon treating it for desensitization with gum arabic solution 14° Be', there were obtained more than 1,000 prints having good quality images. The recording material of this example prepared employing a polymer film, unlike the slick paper of Example 1, had improved durability in printing.

EXAMPLE 4

By sprinkling emergy having a mean grain size 250 mesh over a support consisting of 70 μ-thick polyester film and applying the sandblast method, roughing of the surface of the film support was effected. When a 0.05 μ-thick layer of aluminum was formed on the finely undulated film support by depositing through vacuum evaporation, there was obtained a white mat layer having no metallic luster. The value of glossiness of the surface of the thus obtained spark-recording film was 1.00%. Subsequently, when offset printing was conducted by employing this recording film after image-recording under the same conditions for recording as in Example 3 and desensitizing it with a desensitizing liquid consisting of phosphoric acid, ammonium bichromate solution and gum arabic solution (14° Be'), there was obtained more than 1,000 prints having good quality images.

EXAMPLE 5

After coating a colored liquid prepared by dispersing 10 parts of carbon black as the coloring agent and 100 parts of vinyl chloride~vinyl acetate copolymer as the binder in methyl ethyl ketone on a slick paper weighing 80 g/m$^2$, by depositing aluminum on the thus formed colored layer by vacuum evaporation, a spark-recording material having a 0.05 μ-thick aluminum-deposited layer was prepared.

When spark-recording was conducted employing this spark-recording material under the condition for recording of 8Ω in internal impedance, 35 V in charged voltage for recording and 2.1 m/sec in velocity of recording, there was obtained a recorded image of good quality. When offset printing was conducted by employing various offset masters prepared by desensitizing the non-image area (to wit, the aluminum-deposited surface) of this recording material with various desensitizing liquids (*a*) - (*d*) having the following compositions, respectively, and utilizing a commercial offset printing machine, there was obtained more than 500 prints having stable and distinct images from each master.

| | | |
|---|---|---|
| Desensitizing liquid (a) | | |
| Water | 15 | cc |
| Ammonium phosphate dibasic | 3 | g |
| Phosphoric acid (85%) | 4 | cc |
| Gum arabic (13° Be') | 200 | cc |
| Desensitizing liquid (b) | | |
| CMC | 6 | g |
| Ammonium phosphate dibasic | 5 | g |
| Phosphoric acid (85%) | 2 | g |
| Water | 100 | cc |
| Desensitizing liquid (c) | | |
| PVA | 6 | g |
| Phosphoric acid (85%) | 2 | g |
| Water | 150 | cc |
| Desensitizing liquid (d) | | |
| Water | 15 | cc |
| Ammonium nitrate | 3 | g |
| Phosphoric acid (85%) | 4 | g |
| Gum arabic (13° Be') | 200 | cc |

EXAMPLE 6

In the same way as in Example 5 except for replacing the slick papaer with a 40 μ-thick polyester film, a spark-recording material was prepared. Subsequently, by employing this recording material, conducting the spark-recording under the same condition for recording and treating with the same desensitizing liquids as in Example 5, various offset masters were prepared. When offset printing was conducted using these masters, there were obtained more than 1,000 prints having a stable and distinct image from each master.

EXAMPLE 7

By coating a colored liquid prepared by mixing 10 parts of carbon black and 100 parts of vinyl chloride~vinyl acetate copolymer as the binder in the solvent MEK (methyl ethyl ketone) or a slick paper weighing 80 g/m$^2$, forming a 0.04 μ-thick layer of aluminum by depositing through vacuum evaporation on the thus formed colored layer, and further coating the surface of this aluminum-deposited layer with a liquid prepared by dispersing zinc oxide and acrylic resin (weight ratio = 5:1) in toluene to form a 5 μ-thick protective layer, a spark-recording material was prepared.

When the spark-recording was conducted employing this spark-recording material under conditions for recording of 10Ω in internal impedance, 40 V in charged voltage for recording and 2.1 m/sec in velocity of recording, there was obtained a recorded image of good quality. By using the thus obtained recording material as the offset master and desensitizing the non-image area of its surface protective layer with a desensitizing liquid containing phosphoric acid, potassium ferrocyanate, polyacrylic acid and water, an offset printing plate was prepared. When this printing plate was used for printing with an offset pointing machine (trade name: OFFSET 1000, manufactured by K. K. RICOH), there was obtained more than 500 prints each having a stable and distinct image.

EXAMPLE 8

By coating a colored liquid prepared by mixing 10 parts of carbon black and 100 parts of vinyl chloride~vinyl acetate copolymer as the binder in the solvent MEK on a 40 μ-thick polyester film, forming a 0.05 μ-thick layer of aluminum by depositing through vacuum evaporation on the surface of the thus formed colored layer, and further coating the surface of this aluminum-deposited layer with a liquid prepared by dispersing barium sulfate and acrylic resin (weight ratio = 1:1) in toluene to form a protective layer of about 1 μ in thickness, a spark-recording material was prepared.

When the spark-recording was conducted by employing this spark-recording material under the same condition for recording as in Example 7, there was obtained a recorded image of good quality. When offset printing was performed after desensitizing this recording material in the same way as in Example 7, there were obtained more than 1,000 prints each having a stable and distinct image.

EXAMPLE 9

By coating a colored liquid prepared by mixing 10 parts of carbon black and 100 parts of vinyl chloride~vinyl acetate copolymer as the binder in the solvent MEK on a slick paper weighing 80 g/m$^2$, forming a 0.04 μ-thick layer of aluminum by depositing through vacuum evaporation on the surface of the thus formed colored layer, and further coating the surface of this aluminum-deposited layer with an aqueous solution of PVA to form a 1 μ-thick hydrophilic protective layer containing 0.12 g/m$^2$ of PVA, a spark-recording material was prepared. The surface resistance of this material was 5Ω.

When the spark-recording was conducted employing this spark-recording material under the condition for recording that 10Ω in internal impedance, 40 V in charged voltage for recording and 2.1 m/sec in velocity of recording, there was obtained a recorded image of good quality. By using this recording material as the offset master and desensitizing the non-image area thereof with a desensitizing liquid containing aluminum sulfate, potassium nitrate, ammonium dihydrogen phosphate and water, an offset printing plate was prepared. When this printing plate was used for printing with an offset printing machine (trade name: OFFSET 1000, the manufacture of K. K. RICOH), there were obtained more than 500 prints each having a stable and distinct image with superior resolving power.

EXAMPLE 10

By coating a colored liquid prepared by mixing 10 parts of carbon black and 100 parts of vinyl chloride~vinyl acetate copolymer as the binder in MEK on a 45 μ-thick polyester film, forming a 0.06 μ-thick layer of aluminum by depositing through vacuum evaporation on the surface of the thus formed colored layer, and further coating the surface of this aluminum-deposited layer with an aqueous solution of CMC (carboxymethyl cellulose) to form a 1.2 μ-thick hydrophilic protective layer containing 0.15 g/m$^2$ of CMC, a spark-recording material was prepared. The surface resistance of this material was 7Ω. When spark-recording was conducted employing this spark-recording material under the condition for recording that 10Ω in internal impedance, 43 V in charged voltage for recording and 2.1 m/sec in velocity of recording, there was obtained a recorded image of good quality. By using the thus obtained recording material as the offset master, desensitizing the non-imge thereof, and utilizing the resulting printing plate, offset printing was performed. As a result, there were obtained more than 500 prints each having a stable and distinct image with superior resolving power.

EXAMPLE 11

By coating a colored liquid prepared by mixing 3 parts of zinc oxide powder having a mean particle diameter of 5 - 10 μ as the surface-roughing pigment, 10 parts of carbon black and 100 parts of vinyl chloride~vinyl acetate copolymer as the binder in the solvent MEK on a slick paper weighing 80 g/m$^2$, forming a 0.06 μ-thick layer of aluminum by depositing through vacuum evaporation on the surface of the thus formed colored layer, and further coating lightly the surface of this aluminum-deposited layer with a desensitizing liquid having the same composition as in Example 4 by means of sponge impregnated with said liquid to form a desensitized layer of less than 1 μ in dry thickness, a spark-recording material was prepared.

When the spark-recording was conducted by employing this spark-recording material under the condition for recording that 1Ω in internal impedance, 35 V in charged voltage for recording and 2.1 m/sec in velocity of recording, there was obtained a recorded image of good quality. When the offset printing was performed employing this record material directly as the offset master, there were obtained more than 500 prints having stable and distinct images.

EXAMPLE 12

By coating a colored liquid prepared by mixing 10 parts of carbon black and 100 parts of vinyl chloride~vinyl acetate copolymer as the binder in the solvent MEK on a 40 μ-thick polyester film, forming a 0.05 μ-thick layer of aluminum by depositing through vacuum evaporation on the surface of the thus formed colored layer, further coating the surface of this aluminum-deposited layer with a liquid prepared by dispersing zinc oxide and acrylic resin (weight ratio = 5:1) in toluene as the solvent to form a 2 μ-thick protective layer, and still further coating thinly the surface of this protective layer with a desensitizing liquid having the same composition as in Example 5 by means of sponge impregnated with said liquid, followed by natural drying, to form a desensitized layer of less than 1 μ in dry thickness, a spark-recording material was prepared.

When the spark-recording was conducted employing this spark-recording material under the condition for recording that 10Ω in internal impedance, 40 V in charged voltage for recording and 2.1 m/sec in velocity of recording, there was obtained a recorded image of good quality. When offset printing was performed employing this recording material directly as the offset master, there were obtained more than 1,000 prints each having a stable and distinct image.

EXAMPLE 13

In the same way as in Example 12, by coating a polyvinyl alcohol solution on the surface of the metal (aluminum)-deposited layer to the extent of less than 1 μ in thickness, and further coating thinly the same desensitizing liquid as in Example 6 thereon by means of sponge impregnated with said liquid and drying therefter, a spark-recording material was prepared.

When this spark-recording material was directly utilized for offset printing upon forming an image thereon under the condition for recording that 10 Ω in internal impedence, 40 V in charged voltage for recording and 2.1 m/sec in velocity of recording, there were obtained more than 1,000 prints each having a stable and distinct image.

EXAMPLE 14

By coating a colored liquid prepared by mixing 10 parts of carbon black and 100 parts of vinyl chloride~λ vinyl acetate copolymer as the binder in the solvent MEK on a slick paper weighing 80 g/m², forming a 0.04 μ-thick layer of aluminum by depositing through vacuum evaporation on the surface of the thus formed colored layer, and further coating the surface of this aluminum-deposited layer with a liquid prepared by dispersing zinc oxide and acrylic resin (weight ratio = 5:1) in toluene as the solvent to form a 5 μ-thick surface protective layer, a spark-recording material was prepared.

When spark-recording was conducted employing this spark-recording material under the condition for recording that 10Ω in internal impedance, 40 V in charged voltage for recording and 2.1 m/sec in velocity of recording, there was obtained a recorded image of good quality. By using this recording material as the offset master and desensitizing the non-image area thereof with a desensitizing liquid consisting of sodium ferrocyanate, phosphate, citric acid and water, an offset printing plate was prepared. When this offset printing plate was used for printing with an offset printing machine (trade name: OFFSET 1000, the manufacture of K. K. RICOH), there were obtained more than 500 prints having stable and distinct images.

EXAMPLE 15

By coating a colored liquid prepared by mixing 10 parts of carbon black and 100 parts of vinyl chloride~ vinyl acetate copolymer as the binder in the solvent MEK on a 40 μ-thick polyester film, forming a 0.05 μ-thick layer of aluminum by depositing through vacuum evaporation on the surface of the thus formed colored layer, and further coating the surface of this aluminum-deposited layer with a liquid prepared by dispersing barium sulfate and acrylic resin (weight ratio = 1:1) in toluene as the solvent to form a protective layer of about 1 μ in thickness, a spark-recording material was prepared.

When spark-recording was conducted employing this spark-recording material under the same condition for recording as in Example 14, there was obtained a recorded image of good quality. When this recording material was used for offset printing after desensitization treatment in the same way as in EXAMPLE 14, there were obtained more than 1,000 prints each having a stable and distinct image.

EXAMPLE 16

By coating a colored liquid prepared by dispersing 10 parts of carbon black and 100 parts of vinyl chloride~ vinyl acetate copolymer as the oleophilic binder in the solvent MEK on a slick paper weighing 80 g/m² to form a colored layer thereon, forming a 0.05 μ-thick layer of aluminum by depositing through vacuum evaporation on the surface of the thus formed colored layer, and further coating the surface of this aluminum-deposited layer with an aqueous solution consisting of 10 g of $ZnSO_4$, 10 g of PVA, 1 g of mono- and di-methylol melamine mixture and 200 cc of water to form a protective layer of about 1 μ in thickness, a spark-recording material was prepared.

When spark-recording was conducted employing this spark-recording material under the condition for recording that 1Ω in internal impedance, 35 V in charged voltage for recording and 2.1 m/sec in velocity of recording, there was contained a recorded image of good quality. Next, when offset printing was performed using this recording material as the offset master and upon treating the non-imge area of the surface protective layer thereof with a desensitizing liquid having the following composition by the use of a commercial offset printing machine (trade name: RICOH OFFSET 1000, the manufacture of K. K. RICOH), there were obtained more than 1,000 prints each having a distinct image.

| Composition of desensitizing liquid: | |
|---|---|
| Sodium ferrocyanate | 40 g |
| Ammonium primary phosphate | 20 g |
| Ammonium secondary phosphate | 30 g |
| Citric acid | 30 g |
| Water (in total) | 1 l |

EXAMPLE 17

In the same way as in Example 16 except for applying 10 g of zinc phosphate, 4 g of ethyl cellulose and 100 cc of methanol as the components to form the protective layer, a spark-recording material was prepared. When the succeeding process of spark-recording, densensitization treatment and offset printing were performed in the same way as in Example 16, there were obtained more than 1,000 prints each having a sufficiently distinct image.

EXAMPLE 18

In the same way as in Example 16 except for applying a liquid consisting of 10 g of aluminum hydroxide, 10 g of PVA, 1 g of mono- and di-methylol melamine mixture, 0.5 g of ammonium chloride and 200 cc of water for forming the protective layer and heat-curing treatment at a temperature of 100° C for 30 minutes after coating said liquid, a spark-recording material was prepared. When the succeeding processes of spark-recording, densensitization treatment and offset printing were performed in accordance with the method of Example 16, there were obtained more than 1,000 prints having sufficiently distinct images.

EXAMPLE 19

When the same spark-recording material as used in Example 16 was subjected to spark-recording in the same way as in Example 16, treated with a desensitizing liquid having the following composition and used for offset printing, there were obtained more than 1,000 prints each having a sufficiently distinct image.

| Composition of desensitizing liquid: | |
|---|---|
| Ammonium monohydrogen phosphate | 5 g |
| Acetic acid | 5 g |
| Water | 100 cc |
| Butyl alcohol | 5 g |

EXAMPLES 20 - 25

In the same way as in Example 14 except for replacing the composition of the surface protective layer with the composition shown in the following table, respectively, 6 varieties of spark-recording materials were prepared. When each of these spark-recording materials was subjected to spark-recording in the same way as in Example 14, treated with the respective desensitizing liquid shown in the same table and used for offset printing, there were obtained more than 1,000 prints having distinct images.

| Example No. | Composition of Surface Recording Layer | | Composition of Desensitizing Liquid | |
|---|---|---|---|---|
| 20 | Lead acetate | 10 g | Ammonium monohydrogen phosphate | 5 g |
| | PVA | 10 g | Phosphoric acid | 5 g |
| | Formalin | 2 g | Butyl alcohol | 5 g |
| | Ammonium chloride | 0.2 g | Water | 100 cc |
| | Water | 300 cc | | |
| 21 | Phosphorus pentoxide | 8 g | | |
| | PVA | 8 g | | |
| | Formalin | 1 g | The same as above | |
| | Ammonium chloride | 0.2 g | | |
| | Water | 200 cc | | |
| 22 | Chromium chloride | 10 g | Sodium ferrocyanate | 40 g |
| | CMC | 10 g | Ammonium monohydrogen phosphate | 20 g |
| | Formalin | 1 g | Ammonium dihydrogen phosphate | 30 g |
| | Ammonium chloride | 0.2 g | Citric acid | 30 g |
| | Water | 200 cc | Water | 1000 cc |
| 23 | Manganese hydroxide | 10 g | Ammonium monohydrogen phosphate | 5 g |
| | CMC | 10 g | Phosphoric acid | 5 g |
| | Mono- and di-methylol melamine mixture | 1 g | Butyl alcohol | 5 g |
| | Ammonium chloride | 0.5 g | Water | 100 cc |
| | Water | 200 cc | | |
| 24 | Calcium carbonate | 20 g | Sodium ferrocyanate | 40 g |
| | Acrylic resin | 3 g | Ammonium monohydrogen phosphate | 20 g |
| | Toluene | 200 cc | Ammonium dihydrogen phosphate | 30 g |
| | | | Citric acid | 30 g |
| | | | Water | 1000 cc |
| 25 | Tin bromide | 10 g | | |
| | PVA | 10 g | | |
| | Formalin | 1 g | The same as above | |
| | Ammonium chloride | 0.2 g | | |
| | Water | 200 cc | | |

EXAMPLE 26

By coating a colored liquid prepared by dispersing 10 parts of carbon black and 100 parts of vinyl chloride ~ vinyl acetate copolymer and a binder in MEK on a slick paper weighing 80 g/m$^2$ to form a colored layer, forming a 0.04 $\mu$-thick layer of aluminum by depositing through vacuum evaporation on the surface of the thus formed colored layer, further coating the surface of this aluminum-deposited layer with a primer (PRIMER-A, a manufacture of SHINETSU KAGAKU K.K.), still further coating a toluene solution of 10 parts of 2-liquid type PTV silicone rubber (KE 1300 RTV, the manufacture of SHINETSU KAGAKU K.K.) and 1 part of a curing agent (CATALYST-1300A, the manufacture of SHINETSU KAGAKU K.K) thereon by spray to the extent of about 1 $\mu$ in thickness, and drying at room temperature thereafter, there was obtained a spark-recording material provided with a protective layer containing oil-repellent silicone elastomer. When spark-recording was conducted employing this spark-recording material under the condition for recording that 10 Ω internal impedance, 40 V in charged voltage for recording and 2.1 m/sec in velocity of recording, there was obtained a recorded image of good quality. When offset printing was performed utilizing this recording material as the offset master and without using water, there were obtained more than 1,000 prints each having a stable and distinct image.

EXAMPLE 27

In the same way as in Example 26 except for replacing 2-liquid type RTV silicone rubber with one-liquid type RTV silicone rubber (SILASTIC 140 RTV, a manufacture of DOW CORNING CO.) at the time of forming the protective layer, a spark-recording material was prepared. When this spark-recording material was subjected to spark-recording under the same conditions for recording as in Example 26, there was obtained a recorded image of good quality. When offset printing was performed using this recording material as the offset master and without using water, there were obtained more than 1,000 prints each having a stable and distinct image.

EXAMPLE 28

In the same way as in Example 26 except for replacing the slick paper constituting the support with a 4.0 μ-thick polyester film, a spark-recording material was prepared. When this recording material was subjected to spark-recording in the same way as in Example 26 and then used for printing, it was possible to produce more than 2,000 prints each having a distinct image. This example shows that the use of a polymer film improved the printing durability of the material.

EXAMPLE 29

By forming the same colored layer as in Example 26 on a 40 μ-thick polyester film, forming the same aluminum-deposited layer as in Example 26 on said colored layer, and further forming a protective layer consisting of one-liquid type RTV silicone rubber fluoride (SILASTIC 733 RTV, a manufacture of DOW CORNING CO.) thereon in the same way as in Example 26, a spark-recording material was prepared. When this recording material was subjected to spark-recording and then used for printing, it was possible to produce more than 2,000 prints each having a distinct image.

EXAMPLE 30

In the same way as in Example 29 except for replacing said one-liquid type RTV silicone rubber fluoride with a surface active agent (FX 161, a manufacture of 3M CO.) consisting essentially of carbon fluoride compound, a spark-recording material was prepared. When this spark-recording material was subjected to spark-recording and used for printing, it was possible to obtain more than 2,000 prints each having a distinct image.

What is claimed is:

1. A spark-recording material for use in offset printing, which comprises a support, a colored layer based on oleophilic resin and colorant, a layer of metal deposited by vacuum evaporation, a protective layer based on either (a) hydrophilic polymer or (b) polymer and acid-soluble polyvalent metal compound, and a desensitized layer based on desensitizing substance.

2. A spark-recording material according to claim 1, wherein said desensitizing substance is either (a) at least one member of the group of oil-repellent substances consisting of silicone elastomers, silicone varnishes, silicone oils and carbon fluoride compounds or (b) selected from the group of phosphates.

3. A spark-recording material according to claim 1, wherein said hydrophilic polymer is selected from the group consisting of gum arabic, polyvinyl alcohol, casein, gelatin, starch derivatives, carboxymethyl cellulose and Na salt thereof, methyl cellulose, ethyl cellulose, hydroxyethyl cellulose, cellulose acetate, sodium alginate, vinyl acetate~maleic acid copolymers, styrene~maleic acid copolymers, polyacrylic acids and Na salts thereof, and polymethacrylic acids and Na salt thereof.

4. A spark-recording material according to claim 3, wherein said hydrophilic polymer is selected from the group consisting of gum arabic and Na salt of carboxymethyl cellulose.

5. A spark-recording material according to claim 4 wherein said hydrophilic polymer is Na salt of carboxymethyl cellulose.

6. A spark-recording material according to claim 1, wherein said hydrophilic polymer is selected from the group consisting of gum arabic, polyvinyl alcohol, casein, gelatin, starch derivatives, carboxymethyl cellulose and Na salt thereof, methyl cellulose, ethyl cellulose, hydroxyethyl cellulose, cellulose acetate, sodium alginate, vinyl acetate~maleic acid copolymers, styrene~maleic acid copolymers, polyacrylic acids and Na salts thereof, polymethacrylic acids and Na salts thereof, polyethylene, polystyrene, polyvinyl acetate, polyvinyl chloride, polyvinylidene chloride, polyacrylic ester, polymethacrylic ester, polyester, polyvinyl formal, polyvinyl butyral, polyamide and copolymers thereof, and said polyvalent metal compound is selected from the group consisting of the oxides, sulfides, hydroxides, halogenides, carbonates, phosphates, sulfates, nitrates and organic acid salts of metals belonging to Groups II - VIII of the Table of Periodic Law.

7. A spark-recording material according to claim 1, wherein the ratio by weight of said polymer to said polyvalent metal compound is from about 1:5 to 3:1.

8. A spark-recording material according to claim 6, wherein said polymer is oleophilic.

9. A spark-recording material according to claim 6, wherein said polymer is hydrophilic.

10. A spark-recording material according to claim 6, wherein said polymer is hydrophilic and oleophilic.

11. A spark-recording material according to claim 6, wherein said polyvalent metal compound is a white pigment.

12. A spark-recording material according to claim 1, wherein the ratio by weight of said oleophilic resin to said colorant is about 10:1.

13. A spark-recording material according to claim 1, wherein said oleophilic resin is selected from the group consisting of polyethylene, polypropylene, polystyrene, polyvinyl acetate, polyvinyl chloride, polyvinylidene chloride, polyacrylic ester, polymethacrylic ester, polyester, polyvinyl formal, polyvinyl butyral, polyamide and copolymers thereof.

14. A spark-recording material for use in offset printing comprising a first support layer of paper and the following layers in successive superimposed relationship:

a. A colored layer which is a vinyl chloride-vinyl acetate copolymer containing carbon black, b. A metallic layer of aluminum which has been deposited by vacuum evaporation, c. A protective layer which is polyacrylic acid polymer containing zinc oxide, and d. A top desensitized layer of ammonium dihydrogen phosphate and gum arabic.

* * * * *